United States Patent Office 2,846,922
Patented Aug. 12, 1958

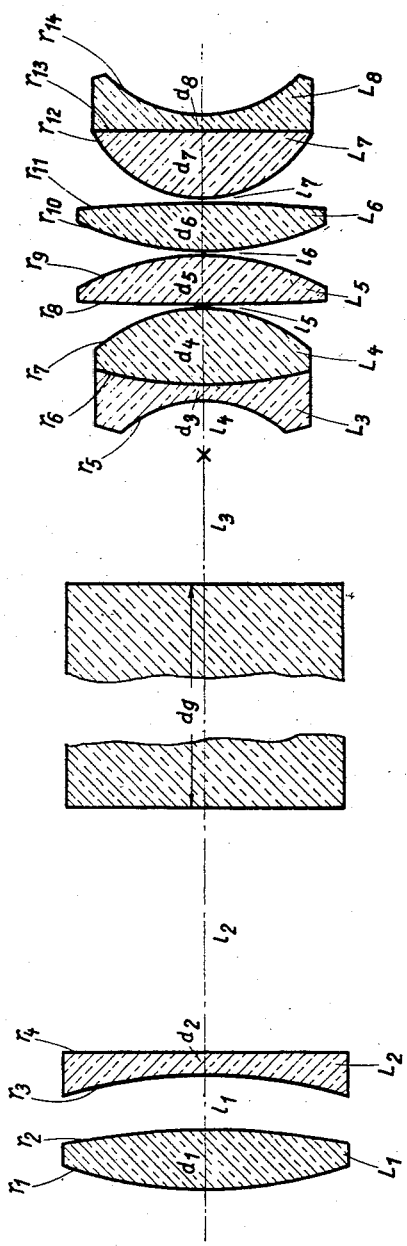

2,846,922

OPTICAL SYSTEM FOR A PRISM BINOCULAR

Horst Kohler, Heidenheim (Brenz), Wurttemberg, Germany, assignor to Carl Zeiss, Heidenheim (Brenz), Wurttemberg, Germany Application August 4, 1955, Serial No. 526,393

Claims priority, application Germany August 10, 1954

3 Claims. (Cl. 88—57)

The present invention concerns an improvement of prism binoculars with collective eyepieces, and aims at the reduction of the overall length and simultaneously at the raising of the subjective field of view to 60° and more. In the binoculars known hitherto the overall length has always been limited to a minimum by the focal lengths of the objectives and of the eyepieces, if importance was attached to maximum image quality. Thus e. g. for the objectives at an objective aperture of 50 mm., objective focal lengths of about 180 mm., and at objective apertures of 30 mm. focal lengths of about 120 mm. were used. A shortening of the focal lengths in order to attain a shortening of the overall length of the binocular failed obviously from the fact that so far no eyepieces were known which permitted the application of short focal lengths; since a reduction of the focal length $f_1$ of the objective means, at equal telescope magnification, also a reduction of the focal length $f_2$ of the eyepieces, and this means a greater magnification of the existing residual aberrations which on reduction below the focal lengths indicated above, with the eyepieces so far known and usual, would result in significant deterioration of the image.

As a complete trigonometrical ray-tracing and the experiments carried out have shown, it is especially those extra-axial image aberrations whose axial co-ordinate depends on the square of the aperture which produce the deterioration of the image. These are essentially aberrations of the fifth order which play a great part in wide-angle eyepieces (cf. H. Köhler and G. Pradel, "A new interpolation method for the determination of the entire blur figure of centered optical systems with image at infinity," in the Z. a. M. M. 31, p. 47, 1951). If one designates the longitudinal aberration in the image plane which is produced by such an error with the objective focal length 1 m. and the aperture ratio 1, by $\Delta s_0$, and the aberration in diopters at the object which results from this, with the focal length $f$ of the objective and the objective aperture D, by $\Delta$ then the relation $$\Delta = \Delta s_0 \frac{D^2}{f^3} \cdot 1000$$

is valid. It has not so far been possible to combine an eyepiece with an objective in telescopes or binoculars with sufficient image quality in which the quotient $$\frac{f^3}{D^2}$$

is smaller than 1900 mm. The present invention consists in the application, in a prism binocular with collective eyepieces, for the purpose of achieving a particularly short overall length and a large subjective field of 60° and more, of collective eyepieces consisting of four members separated by air spaces from each other and including two inner positive lens members enclosed by two external members of which the one on the image side and the other on the eye side, are thick menisci turning their concave sides outwards and each consisting of two lenses of opposed refractive powers cemented to each other, in which the dispersive lenses stand on the outside, and in which further the axial thickness of each of these menisci is larger than 0.25 times the focal length of the eyepiece and the external radius of the meniscus standing on the image side is at most 1.5 times and the external radius of the meniscus standing on the eye-side being smaller than 1.3 times the focal length of the eyepiece and the individual focal length of the meniscus standing on the image side being greater than five times the focal length of the eyepiece. Furthermore according to the invention objectives are used consisting of a single positive front biconvex lens element and a rear negative meniscus-shaped lens element having its concave side turned towards the said positive front lens element, the individual focal length of the said positive front lens element and the individual focal length of the said rear negative meniscus lens element being so related that the two said lens elements are axially separated apart by an air space amounting at least to 3% and at most 10% and the back focal length is at least 70% and at most 90% of the total focal length of the whole objective lens system whereby the rear principal focal plane of the objective lens system is displaced forwards of the objective lens system in the direction towards the object, and the said total focal length being reduced and the clear aperture enlarged to such an extent that the quotient of the third power of the focal length of the objective and of the second power of the clear aperture is smaller than 1500 mm. Furthermore according to the invention prism systems are used which for the purpose of reducing chromatic difference of magnification consist of a glass the quotient $$\frac{n_\text{F} - n_\text{C}}{n_d^2}$$

of which is greater than .0055, $n_\text{F}$, $n_\text{C}$ and $n_d$ signifying the refractive indices for the Fraunhofer lines F, C, and $d$.

It is a further advantage if in the eyepieces the individual focal length of the image-side meniscus has the negative sign. Furthermore the refractive indices of the glasses of the collective lenses in the cemented external menisci of the eyepieces are usefully selected greater than 1.6 and their Abbe numbers greater than 55, and further at least two members are arranged between these menisci, which are made as collective single lenses with indices also greater than 1.6 and with Abbe numbers greater than 58. In this it is also opportune to select the radius of the cemented surface in the eye-side cemented meniscus within the limits from $-\frac{1}{15}$ to $+\frac{1}{2}$ the focal length of the eyepiece.

The figures of the accompanying illustration show an embodiment for an optical system of a binocular according to the invention. The optical data of this system (radii, lens thicknesses, air spaces) are given in the following table, these data being related to a focal length for the objective of 100 units of length, and these as well as the glass types are given in the following table.

| Lenses | Radii | Thicknesses and Separations | $n_d$ | $v_d$ | Glass Types | |
|---|---|---|---|---|---|---|
| $L_1$ | $r_1=+45.3$ | $d_1=5.66$ | 1.61720 | 54.0 | SSK 1 | |
|  | $r_2=-73.9$ | $l_1=5.45$ |  |  |  | |
| $L_2$ | $r_3=-51.6$ | $d_2=2.34$ | 1.7174 | 29.5 | SF 1 | Objective |
|  | $r_4=\infty$ | $l_2=24.0$ |  |  |  | |
| Glass path |  | $d_g=74.6$ | 1.6200 | 36.3 | F 2 | |
|  |  | $l_3=12.4$ |  |  |  | |
|  |  | $l_4=5.4108$ |  |  |  | |
| $L_3$ | $r_5=-12.4126$ | $d_3=1.5109$ | 1.7283 | 28.3 | SF 10 | |
|  | $r_6=+41.5770$ |  |  |  |  | |
| $L_4$ | $r_7=-16.5524$ | $d_4=7.4599$ | 1.6074 | 56.7 | SK 2 | |
|  |  | $l_5=0.0944$ |  |  |  | |
| $L_5$ | $r_8=+294.3437$ | $d_5=4.9103$ | 1.6204 | 60.3 | SK 16 | |
|  | $r_9=-26.2332$ |  |  |  |  | |
|  |  | $l_6=0.0944$ |  |  |  | Eyepiece |
| $L_6$ | $r_{10}=+29.0142$ | $d_6=4.9103$ | 1.6204 | 60.3 | SK 16 | |
|  | $r_{11}=-129.6034$ |  |  |  |  | |
|  |  | $l_7=0.0944$ |  |  |  | |
| $L_7$ | $r_{12}=+12.5921$ | $d_7=6.5156$ | 1.5891 | 61.2 | SK 5 | |
|  | $r_{13}=\infty$ |  |  |  |  | |
| $L_8$ |  | $d_8=1.4164$ | 1.7552 | 27.5 | SF 4 | |
|  | $r_{14}=+14.1284$ | $l_8=8.7819$ |  |  |  | |

I claim:
1. Optical system for a prism binocular including, for the purpose of achieving a relatively short overall length and a large subjective angular field of 60° or more, two objective lens systems of the telephoto type, two collective ocular systems and two prism systems each arranged in optical alignment between one of said objective lens systems and one of said ocular systems, said objective lens systems consisting each of a single positive front biconvex lens element and a rear negative meniscus shaped lens element having its concave side turned towards the said positive front lens element, the individual focal length of the said positive front lens element and the individual focal length of the said rear negative meniscus lens element being so related that the two said lens elements are axially separated apart by an air space amounting at least to 3% and at most 10% of the total focal length of the whole objective and the back focal length is at least 70% and at most 90% of the total focal length of the whole objective lens system, whereby the rear principal focal plane of the objective lens system is displaced forwards of the objective lens system in the direction towards the object, and the total focal length being reduced and the clear aperture enlarged to such an extent that the quotient of the third power of said total focal length and the second power of the clear aperture of said objective lens system is smaller than 1500 mm., said collective ocular systems consisting each of four members separated by air spaces from each other and including two inner positive lens members enclosed by two external members, the one on the image side and the other on the eye-side being thick menisci turning their concave surfaces outwards and consisting each of two cemented lenses of opposite refractive power, the dispersive lenses of which standing on the outside, the axial thicknesses of each said menisci being greater than .25 times the focal length of the ocular, and the external radius of the meniscus standing on the image side being smaller than 1.5 times, and the external radius of the meniscus standing on the eye-side being smaller than 1.3 times of the ocular focal length, and the individual focal length of the meniscus standing on the image side being greater than five times the focal length of the ocular, said prism systems for the purpose of reducing chromatic difference of magnification consisting of a glass the quotient

$$\frac{n_F - n_C}{n_d^2}$$

of which being greater than .0055, $n_F$, $n_C$ and $n_d$ signifying the refractive indices for the Fraunhofer lines F, C and d.

2. Optical system according to claim 1, in the said oculars the individual focal length of the meniscus standing on the image side having the negative sign.

3. Optical system according to claim 1, the refractive indices of the glasses of the said collective lenses in the said two cemented external menisci of the ocular systems being greater than 1.6 and their Abbe numbers greater than 55, and between said two menisci in said ocular systems two collective lenses having refractive indices greater than 1.6 and Abbe numbers greater than 58.

References Cited in the file of this patent

UNITED STATES PATENTS

| 2,500,017 | Altman | Mar. 7, 1950 |
| 2,541,014 | Orser | Feb. 13, 1951 |
| 2,549,158 | Bertele | Apr. 17, 1951 |
| 2,621,564 | Bertele | Dec. 16, 1952 |

FOREIGN PATENTS

| 499,992 | Germany | June 25, 1930 |
| 501,456 | Germany | July 14, 1930 |
| 236,612 | Switzerland | July 2, 1945 |
| 861,469 | Germany | Jan. 5, 1953 |
| 904,476 | Germany | Feb. 18, 1954 |